(12) United States Patent
Sakamoto

(10) Patent No.: US 10,863,158 B2
(45) Date of Patent: Dec. 8, 2020

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Daisuke Sakamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 331 days.

(21) Appl. No.: 15/593,107

(22) Filed: May 11, 2017

(65) Prior Publication Data
US 2017/0339386 A1    Nov. 23, 2017

(30) Foreign Application Priority Data

May 17, 2016  (JP) ................. 2016-098674
Apr. 7, 2017   (JP) ................. 2017-076793

(51) Int. Cl.
| | | |
|---|---|---|
| *H04N 9/73* | (2006.01) | |
| *H04N 1/60* | (2006.01) | |
| *H04N 19/124* | (2014.01) | |
| *H04N 19/136* | (2014.01) | |
| *H04N 19/186* | (2014.01) | |
| *H04N 19/91* | (2014.01) | |
| *H04N 5/77* | (2006.01) | |
| *H04N 19/85* | (2014.01) | |
| *H04N 9/804* | (2006.01) | |

(Continued)

(52) U.S. Cl.
CPC ........... *H04N 9/735* (2013.01); *H04N 1/6005* (2013.01); *H04N 1/6027* (2013.01); *H04N 5/77* (2013.01); *H04N 9/045* (2013.01); *H04N 9/8042* (2013.01); *H04N 19/124* (2014.11); *H04N 19/136* (2014.11); *H04N 19/146* (2014.11); *H04N 19/186* (2014.11); *H04N 19/647* (2014.11); *H04N 19/85* (2014.11); *H04N 19/91* (2014.11); *H04N 1/6077* (2013.01); *H04N 1/648* (2013.01); *H04N 2209/046* (2013.01)

(58) Field of Classification Search
CPC .... H04N 9/735; H04N 19/124; H04N 19/136; H04N 19/146; H04N 19/186; H04N 19/85; H04N 19/91; H04N 1/6005; H04N 1/6027; H04N 5/77; H04N 9/045; H04N 9/8042

See application file for complete search history.

(56) References Cited

U.S. PATENT DOCUMENTS

| | | | | |
|---|---|---|---|---|
| 8,014,597 B1 * | 9/2011 | Newman | ............... | G06K 9/36 382/166 |
| 8,358,319 B2 * | 1/2013 | Cote | ................. | H04N 9/045 345/611 |

(Continued)

FOREIGN PATENT DOCUMENTS

| | | |
|---|---|---|
| JP | 2003-125209 A | 4/2003 |
| JP | 2006-121669 A | 5/2006 |

*Primary Examiner* — Mishawn N. Hunter
(74) *Attorney, Agent, or Firm* — Canon U.S.A., Inc. IP Division

(57) ABSTRACT

The image processing apparatus includes a white balance adjustment circuit configured to adjust a color temperature to RAW data of an image obtained by capturing, a generator circuit configured to generate data of planes for each component of the image from data of which color temperature was adjusted, and a RAW encoding circuit configured to conduct compression encoding of the data of the planes.

22 Claims, 9 Drawing Sheets

(51) Int. Cl.
*H04N 9/04* (2006.01)
*H04N 19/146* (2014.01)
*H04N 19/64* (2014.01)
*H04N 1/64* (2006.01)

(56) References Cited

U.S. PATENT DOCUMENTS

| | | | | |
|---|---|---|---|---|
| 9,595,085 | B2* | 3/2017 | Kuramoto | G06T 5/009 |
| 2002/0044778 | A1* | 4/2002 | Suzuki | H04N 1/56 |
| | | | | 396/429 |
| 2002/0054220 | A1* | 5/2002 | Takeuchi | H04N 9/735 |
| | | | | 348/223.1 |
| 2004/0119843 | A1* | 6/2004 | Hoshuyama | H04N 1/6058 |
| | | | | 348/222.1 |
| 2004/0120690 | A1* | 6/2004 | Takeshita | H04N 1/2137 |
| | | | | 386/349 |
| 2005/0276496 | A1* | 12/2005 | Molgaard | H04N 19/105 |
| | | | | 382/244 |
| 2007/0127095 | A1* | 6/2007 | Sugimori | H04N 1/40068 |
| | | | | 358/520 |
| 2007/0236715 | A1* | 10/2007 | Hashimoto | H04N 9/735 |
| | | | | 358/1.9 |
| 2008/0088857 | A1* | 4/2008 | Zimmer | H04N 1/56 |
| | | | | 358/1.6 |
| 2008/0089580 | A1* | 4/2008 | Marcu | H04N 9/045 |
| | | | | 382/162 |
| 2009/0115853 | A1* | 5/2009 | Umeyama | H04N 1/00278 |
| | | | | 348/207.1 |
| 2009/0147287 | A1* | 6/2009 | Misawa | H04N 1/56 |
| | | | | 358/1.9 |
| 2013/0293735 | A1* | 11/2013 | Suzaki | H04N 5/23219 |
| | | | | 348/222.1 |
| 2015/0029358 | A1* | 1/2015 | Kaizu | G06T 3/4015 |
| | | | | 348/223.1 |
| 2015/0296193 | A1* | 10/2015 | Cote | H04N 9/646 |
| | | | | 382/167 |
| 2016/0219227 | A1* | 7/2016 | Sato | H04N 5/2622 |

* cited by examiner

IMAGE PROCESSING APPARATUS, IMAGE PROCESSING METHOD, AND PROGRAM

BACKGROUND OF THE INVENTION

Field of the Invention

An aspect of the embodiments relates to an image processing apparatus which processes data of a captured image, an image processing method, and a program.

Description of the Related Art

An image pickup apparatus, such as a digital camera and a digital video camera, recently employs a CCD sensor or a CMOS sensor as an image sensor. Each pixel forms each color component of a color filter array (CFA) disposed on a surface of the sensor. If a CFA of a Bayer array in which color filters of R(red), G0(green), B(blue), and G1(green) are arranged in a periodical pattern is used, for example, RGB data corresponding to the Bayer array (hereinafter, "RAW data") is obtained from the sensor. The image pickup apparatus conducts a demosaicing process to the RAW data, and encodes and records RGB data obtained by the demosaicing process or YUV data obtained through color conversion from the RGB data.

Japanese Patent Laid-Open No. 2003-125209 discloses a method for encoding RAW data after separating into four planes of R, G0, B, and G1, for example. Hereinafter, this method is referred to as a 4-plane system. Japanese Patent Laid-Open No. 2006-121669 discloses a method for encoding RAW data by separating the RAW data into four planes of R, G0, B, and G1 as in the method of Japanese Patent Laid-Open No. 2003-125209, approximately converting the RAW data into channels corresponding to luminance and color differences (four channels of Y, Co, Cg, and Dg in Japanese Patent Laid-Open No. 2006-121669), and then encoding the RAW data. Hereinafter, this method is referred to as a color conversion system. In the 4-plane system described in Japanese Patent Laid-Open No. 2003-125209, since a G0 component and a G1 component which are highly correlated with each other due to their mutual spatial proximity and the same color are separated into different planes, an encoding efficiency may be lowered as compared with a case where the G0 component and the G1 component are encoded collectively. The color conversion system described in Japanese Patent Laid-Open No. 2006-121669 can prevent a decrease in perceived resolution by assigning a greater amount of encoded data to channels of luminance (Y) using visual characteristics of humans, and can increase subjective image quality.

Since the demosaicing process described above is a process to let a single pixel have three color components of R, G, and B, a data volume of the RAW data after the demosaicing process becomes 3 times as large as it was before conducting the demosaicing process. To address this issue, a method for directly encoding RAW data before being subject to the demosaicing process, and then conducting a RAW developing process and recording, etc., is proposed.

However, a level of each color of RGB in a condition of RAW data and a level of each color of RGB after the RAW developing process (e.g., after being subject to white balance adjustment and the demosaicing process) do not match in many cases. Therefore, if the RAW developing process is conducted after encoding the RAW data while separating into four planes of R, G0, B, and G1, for example, a difference may occur in a quantization error in the RGB after the RAW developing process even if the same quantization is conducted during encoding of each plane. When the encoded image data is decoded and displayed on a display device, color distortion caused by the difference in the quantization error among the RGB may appear and impair image quality. In the color conversion system, color levels of the RGB before and after conducting the white balance adjustment do not match. Therefore, the luminance and the color difference are not desirably separated, and it is not possible to assign a greater amount of encoded data to the luminance, whereby an encoding efficiency is lowered.

Thus, there is a room for improvement in preventing image quality degradation and increasing an encoding efficiency of RAW data.

SUMMARY OF THE INVENTION

An aspect of the embodiments adjusts a color temperature to RAW data of an image obtained by capturing, generates data of planes for each component of the image from data of which color temperature was adjusted, and conducts compression encoding of the data of the planes.

Further features of the disclosure will become apparent from the following description of exemplary embodiments with reference to the attached drawings.

DESCRIPTION OF THE EMBODIMENTS

Hereinafter, embodiments of the disclosure are described in detail with reference to the drawings.

First Embodiment

Figure 1A:
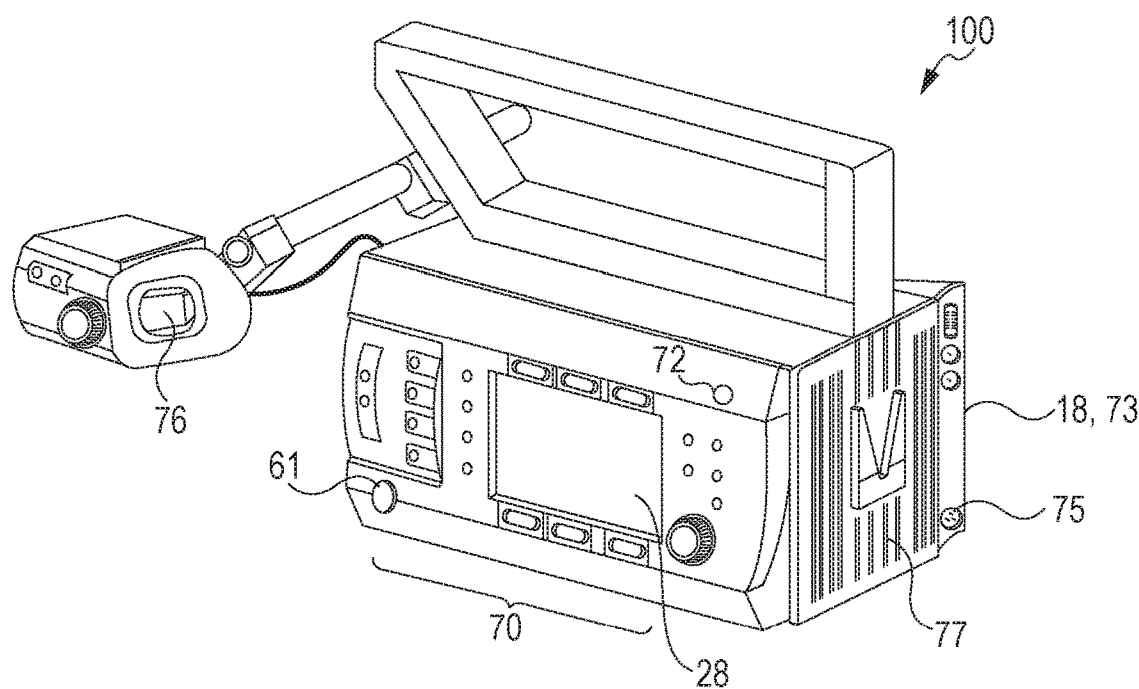
FIG. 1A is an external view of a digital camera according to a first embodiment.

FIG. 1A is an external view of a digital camera 100 which can capture a video image and a still image as one embodiment of an image processing apparatus to which the aspect of the disclosure is applicable. A business-use camera is described here, but the aspect of the disclosure is applicable also to a consumer digital camera and a consumer video camera. The aspect of the disclosure is applicable also to various mobile terminals having a camera function and an image processing function, such as a smart phone and a tablet terminal, and various image pickup apparatuses, such as an industrial camera, an in-vehicle camera, and a camera for medical use. Furthermore, the aspect of the disclosure is applicable also to apparatuses having no camera function but having an image processing function of receiving images from these various image pickup apparatuses and processing the images, such as a personal computer, a server, or a tablet terminal.

A monitor 28 in FIG. 1A is a monitor for displaying an image and various types of information. A shutter button 61 is an operation unit for providing a capturing instruction. Operation members 70 include various switches, buttons, etc. for receiving various operations from a user. A power switch 72 is a push button for switching ON and OFF of power. The monitor 28 is disposed on a side surface of the digital camera 100 and on which menu items, captured images, etc., can be displayed. Buttons disposed above and below the monitor 28 correspond to the items displayed on the monitor 28. When a button is pressed, an item on the monitor 28 can be selected. A power supply source, a residual amount of power, setting values about image capturing, etc. are displayed on the monitor 28. A viewfinder 76 is an electronic viewfinder on which an image captured with the digital camera 100 is displayed. An unillustrated recording medium 73 is a non-transitory recording medium, such as a memory card and a hard disk, and is connectable with an interface (I/F) 18 of the digital camera 100. A battery and an external recorder illustrated in FIG. 1B may be attached to an external I/F 77. The external I/F 77 is an interface member for inputting power supply, and inputting and outputting image signals, sound signals, and control signals (a member which can receive power supply and external input). A power supply I/F 75 is an interface member for power supply input to which an AC adapter, for example, can be attached. Power input from the power supply I/F 75 is used prior to power input from the external I/F 77. An unillustrated lens mount is provided on a side opposite to the side of the external I/F 77, and an interchangeable lens unit can be attached to and detached from the lens mount.

Figure 1B:
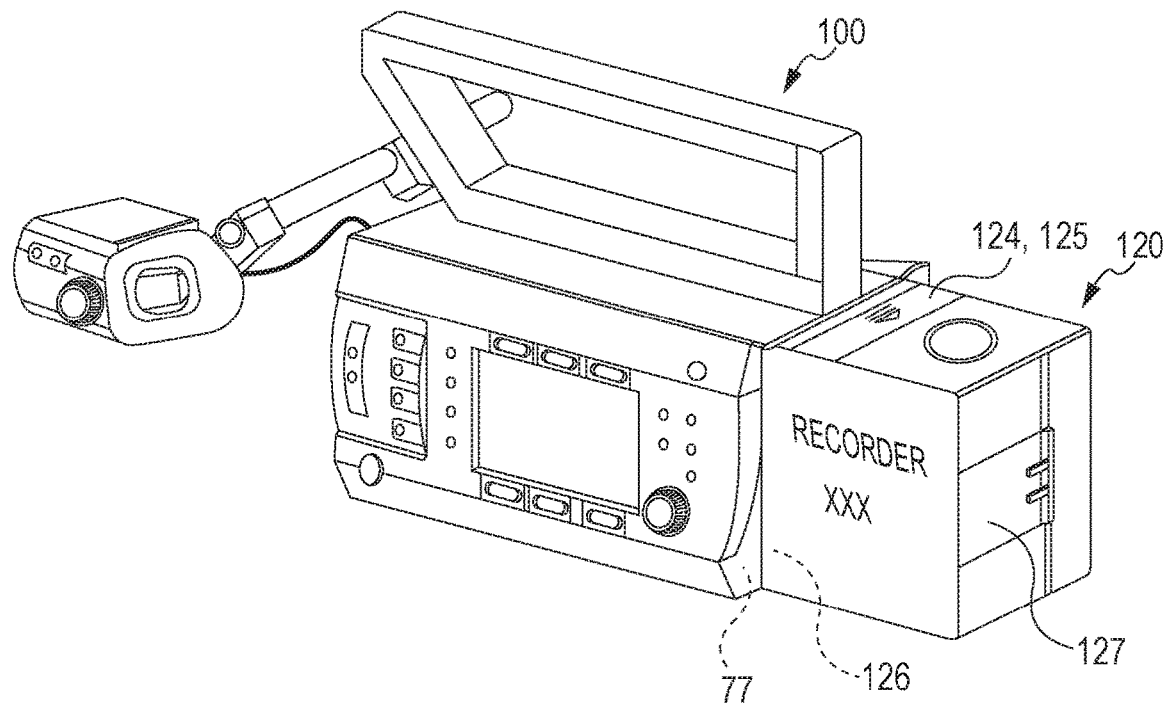
FIG. 1B is an external view of the digital camera with a recorder attached thereto.

A recorder 120 illustrated in FIG. 1B is a recording apparatus connectable with the digital camera 100 at the external I/F 77 of the digital camera 100 and the external I/F 126 of the recorder 120. The recorder 120 includes a recording medium I/F 124 and a detachable recording medium 125. The recorder 120 has memory for recording data with larger capacitance than that of a recording medium of the digital camera 100, and has a higher throughput about images. A power supply I/F 127 is an I/F for connecting a battery which can supply power to the recorder 120. Power supplied to the recorder 120 via the power supply I/F 127 is supplied also to the digital camera 100 via the external I/F 126.

Although a configuration in which the recorder 120 can be attached to and detached from the digital camera 100 is described as an example in the present embodiment, this configuration is not restrictive. The recorder 120 may be built in the digital camera 100. Although a configuration in which an interchangeable lens unit is attached to and detached from the digital camera 100 is described as an example, an image pickup lens may be fixed to the digital camera 100.

Figure 2:
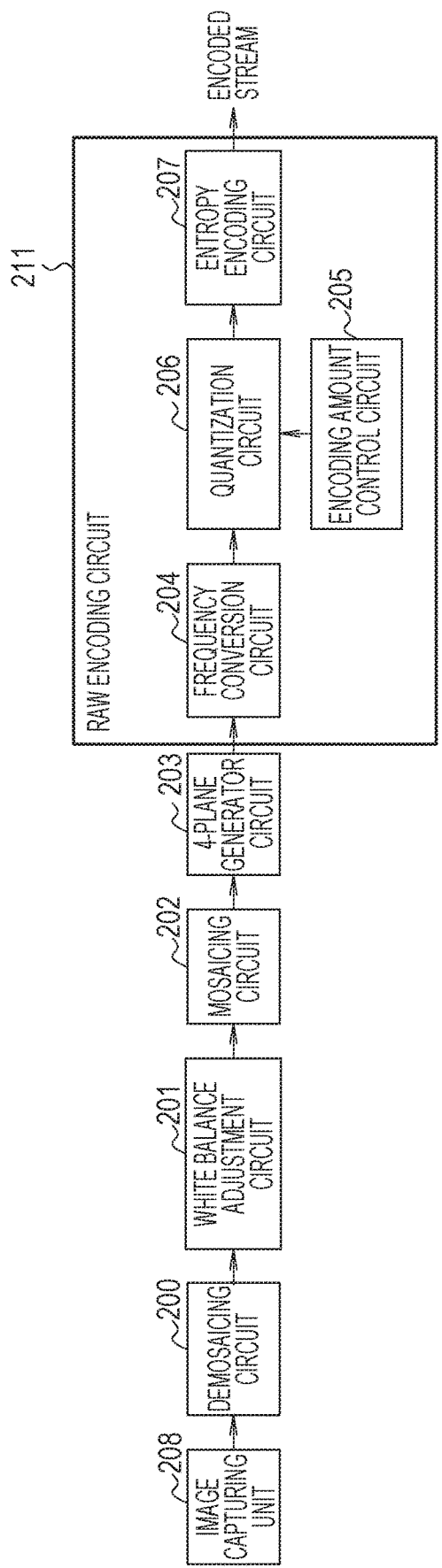
FIG. 2 illustrates an example of a schematic structure of an image processing apparatus according to the first embodiment.

FIG. 2 illustrates an example of a schematic structure of a main part of the digital camera 100 as an image processing apparatus of a first embodiment. As illustrated in FIG. 2, the image processing apparatus of the present embodiment includes an image capturing unit 208, a demosaicing circuit 200, a white balance adjustment circuit 201, a mosaicing circuit 202, a 4-plane generator circuit 203, and a RAW encoding circuit 211. The RAW encoding circuit 211 includes a frequency conversion circuit 204, a quantization circuit 206, an entropy encoding circuit 207, and an encoding amount control circuit 205. Although JPEG 2000 is described as an example of a compression encoding system used in the RAW encoding circuit 211 in the present embodiment, other compression encoding systems may also be used.

Figure 3:
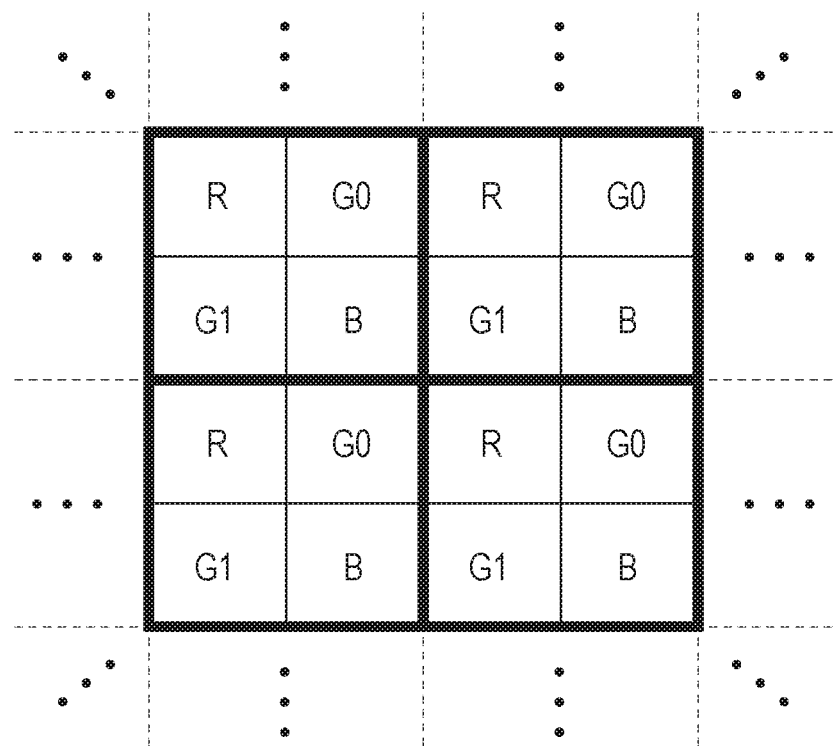
FIG. 3 is an explanatory diagram of a Bayer array.

The image capturing unit 208 is a general image pickup optical unit constituted by a shutter mechanism, an image capturing sensor (an imager), etc. If the image pickup lens is fixed to the digital camera 100, the image capturing unit 208 further includes an optical lens and a diaphragm mechanism. The image capturing sensor may be a CCD sensor or a MOS sensor provided with a color filter array (CFA) on a surface of an imaging surface. The CFA is a filter of the Bayer array, for example, in which filters of three primary colors of R(red), G0(green), B(blue), and G1(green) are arranged in a periodical pattern. FIG. 3 is a partially enlarged view of the CFA of the Bayer array. With the CFA illustrated in FIG. 3, RAW data consisting of data of each color component of R, G0, B, and G1 of the Bayer array is output from the image capturing sensor. Since visual characteristics of humans are highly sensitive to a brightness component, in a general Bayer array, as illustrated in FIG. 3, twice the number of pixels of the component R and the component B are assigned to the component G which is included in a greater amount in the brightness component. The image capturing sensor separates an optical image focused on an imaging surface with an optical lens etc. into colors of R, G0, B, and G1 with the CFA, conducts digital conversion of electrical signals according to a light amount of each color component after the color separation, and outputs as RAW data. The RAW data is transmitted to the demosaicing circuit 200.

Figure 4:
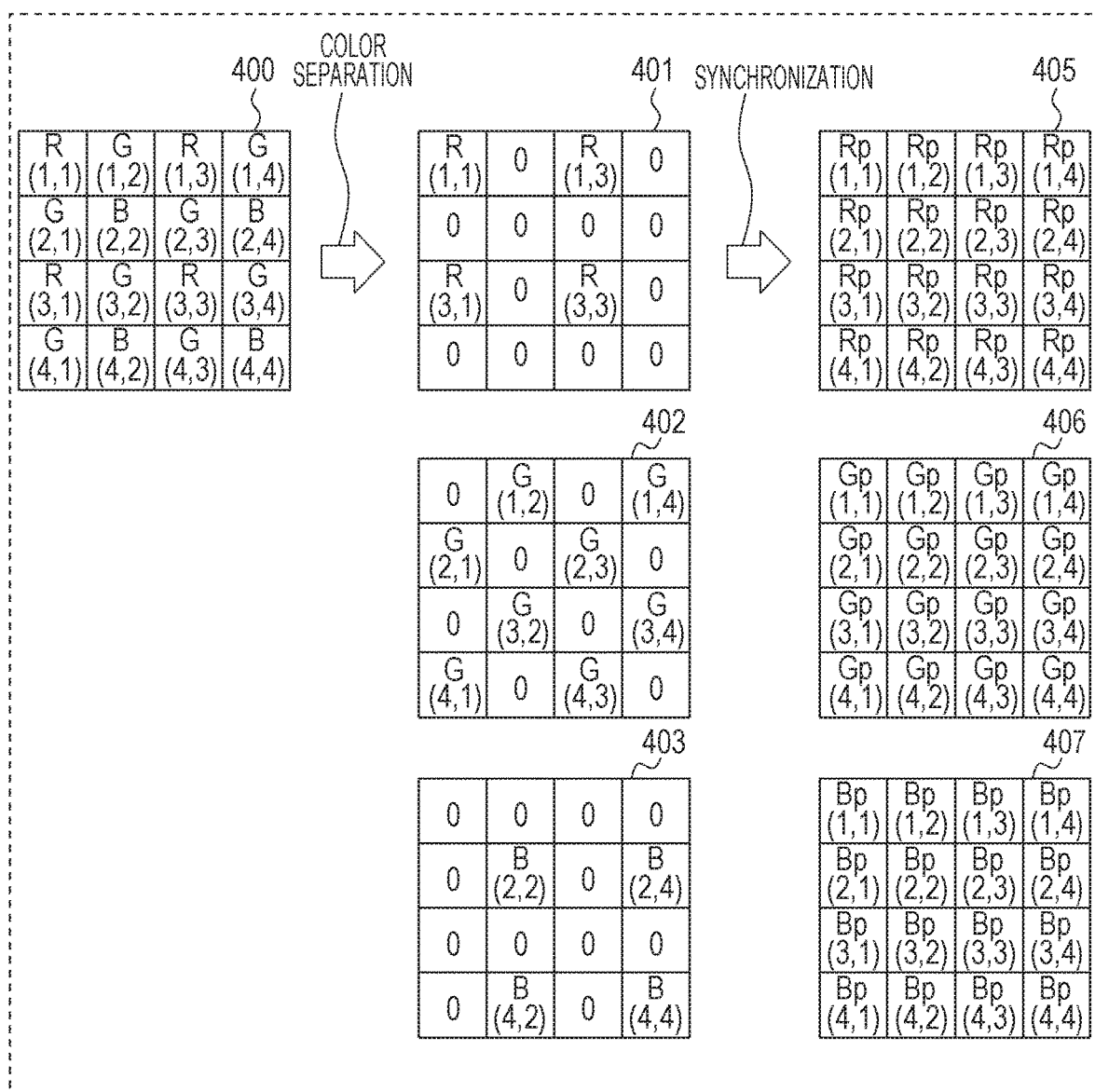
FIG. 4 is an explanatory diagram of a debayer process (a demosaicing process).

The demosaicing circuit 200 conducts a debayer process (a demosaicing process) to separate the RAW data consisting of data of each color component of the Bayer array into data for each color component of RGB. FIG. 4 is an explanatory diagram of a debayer process (a demosaicing process) by the demosaicing circuit 200. In FIG. 4, G0 and G1 illustrated in FIG. 2 are not distinguished but illustrated collectively as G.

As a debayer process, the demosaicing circuit 200 first conducts a color separation process to separate data 400 of RGB of the Bayer array as illustrated in FIG. 4 into data 401 to 403 of each color component of RGB. Specifically, the demosaicing circuit 200 leaves pixel values at pixel positions of the R component of the data 400, and inserts 0 as pixel values at pixel positions of the G component and the B component other than the pixel positions of the R component, thereby generating data 401. Similarly, the demosaicing circuit 200 leaves pixel values at pixel positions of the G component of the data 400, and inserts 0 as pixel values at pixel positions of the R component and the B component other than the pixel positions of the G component, thereby generating data 402. Similarly, the demosaicing circuit 200 leaves pixel values at pixel positions of the B component of the data 400, and inserts 0 as pixel values at pixel positions of the R component and the G component other than the pixel positions of the B component, thereby generating data 403.

Next, the demosaicing circuit 200 conducts a synchronization process (a demosaicing process) to the data 401 to 403 which have been subject to the color separation process separately for each color component of RGB as illustrated in FIG. 4, and generates data 405 to 407. The synchronization process is a process to leave a pixel value at a pixel position where the pixel value of 0 is not inserted in the color separation process, and insert a pixel value generated by interpolation from surrounding pixel values at a pixel position where the pixel value of 0 is inserted in the color separation process. Specifically, in the data 401 of the R component, if a pixel value at coordinates (m,n) before interpolation is defined as R(m,n) and a pixel value after interpolation is defined as Rp(m,n), the demosaicing circuit 200 calculates the pixel values after interpolation Rp(m,n) from Expressions (1) to (4). Expressions (1) to (4) are Expressions for obtaining pixel values after interpolation Rp(1,1), Rp(1,2), Rp(2,1), and Rp(2,2). Expressions for obtaining pixel values after interpolation Rp(m,n) at coordinates (m,n) other than these are omitted, but each pixel value can be generated in the same manner. Thus, the data 405 is obtained from the data 401.

$$Rp(1,1)=R(1,1) \quad (1)$$

$$Rp(1,2)=\{R(1,1)+R(1,3)\}/2 \quad (2)$$

$$Rp(2,1)=\{R(1,1)+R(3,1)\}/2 \quad (3)$$

$$Rp(2,2)=\{R(1,1)+R(1,3)+R(3,1)+R(3,3)\}/4 \quad (4)$$

Regarding the data 403 of the B component, the demosaicing circuit 200 conducts the same synchronization process as the case of the R component and generates pixel values after interpolation Bp(m,n) to thereby generate the data 407.

The demosaicing circuit 200 calculates pixel values after interpolation Gp(m,n) by Expressions (5) to (8) regarding the data 402 of the G component of FIG. 4. Expressions (5) to (8) are Expressions for obtaining pixel values after interpolation Gp(2,2), Gp(2,3), Gp(3,2), and Gp(3,3). Expressions for obtaining pixel values Gp(m,n) after interpolation at coordinates (m,n) other than these are omitted, but each pixel value can be generated in the same manner. Thus, the data 406 is obtained from the data 402.

$$Gp(2,2)=\{G(1,2)+G(3,2)+G(2,1)+G(2,3)\}/4 \quad (5)$$

$$Gp(2,3)=G(2,3) \quad (6)$$

$$Gp(3,2)=G(3,2) \quad (7)$$

$$Gp(3,3)=\{G(2,3)+G(4,3)+G(3,2)+G(3,4)\}/4 \quad (8)$$

The interpolation method of the pixel values in the synchronization process is merely an example, and various other publicly known interpolation methods may be used. For example, to prevent characteristic degradation of a high-frequency component of an original signal, correlations in up, down, left and right directions of an object area, for example, may be determined in advance, and weighting of a signal located in the direction with the highest correlation may be increased before conducting interpolation. For example, regarding a pixel of an interpolation target, correlation between the pixel values of G component on the upper and lower sides is compared with correlation between the pixel values of G component on the right and left sides, a ratio to the pixel value of the G component with higher correlation may be increased to thereby obtain the pixel value of the pixel of interpolation target. Alternatively, the pixel value of the pixel of interpolation target may be obtained by only using the pixel value of the G component with higher correlation. The data after being subject to the debayer process (the demosaicing process) described above by the demosaicing circuit 200 (data 405 to 407) is transmitted to the white balance adjustment circuit 201.

The white balance adjustment circuit 201 conducts a white balance adjustment process to substantially match levels of the color components of RGB of the pixels in an object area that can be considered to be white. Specifically, the white balance adjustment circuit 201 calculates gain coefficients separately for each color component of RGB of the pixel in the object area considered to be white, and multiplies the gain coefficient to each color component so as to match the levels of the color components of RGB. Since the gain coefficient can be calculated in a general manner, detailed description thereof is omitted.

Figure 5A:
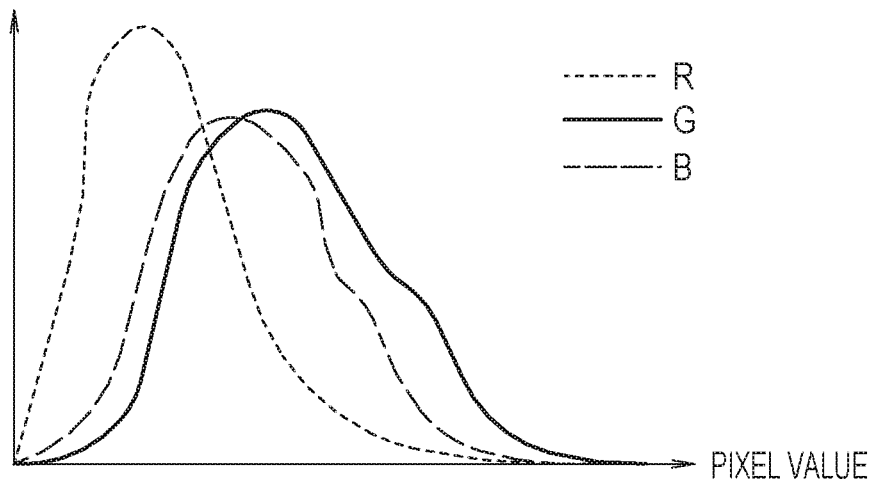
FIG. 5A illustrates examples of histograms of RGB before white balance adjustment.
Figure 5B:
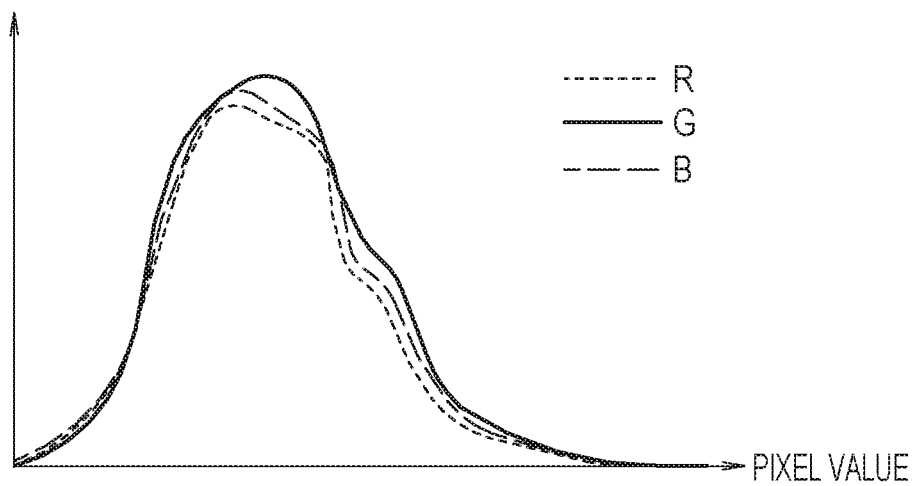
FIG. 5B illustrates examples of histograms of RGB after white balance adjustment.

FIG. 5A illustrates examples of histograms of the color components of RGB before conducting the white balance adjustment, in which a vertical axis represents the number of samples of a plurality of pixels of each color component of RGB and a horizontal axis represents a pixel value of each color component of RGB. FIG. 5B illustrates examples of histograms of the color components of RGB after conducting the white balance adjustment, in which the same matters are plotted on the vertical and the horizontal axes as those of FIG. 5A. In the example of FIG. 5A, the number of samples of pixels of which pixel values of the R component are relatively small compared with the pixel values of the G component or the B component among the color components of RGB before being subject to the white balance adjustment is large. In such a case, in the white balance adjustment, as illustrated in FIG. 5B, adjustment is made such that the pixel values of the G component and the B component are not changed significantly, whereas a large gain coefficient is multiplied to the pixel values of the R component. Therefore, the histograms of the color components of RGB after the white balance adjustment substantially match. The data of the color components of RGB after being subject to the white balance adjustment process by the white balance adjustment unit 101 is transmitted to the mosaicing circuit 202.

Figure 6A:
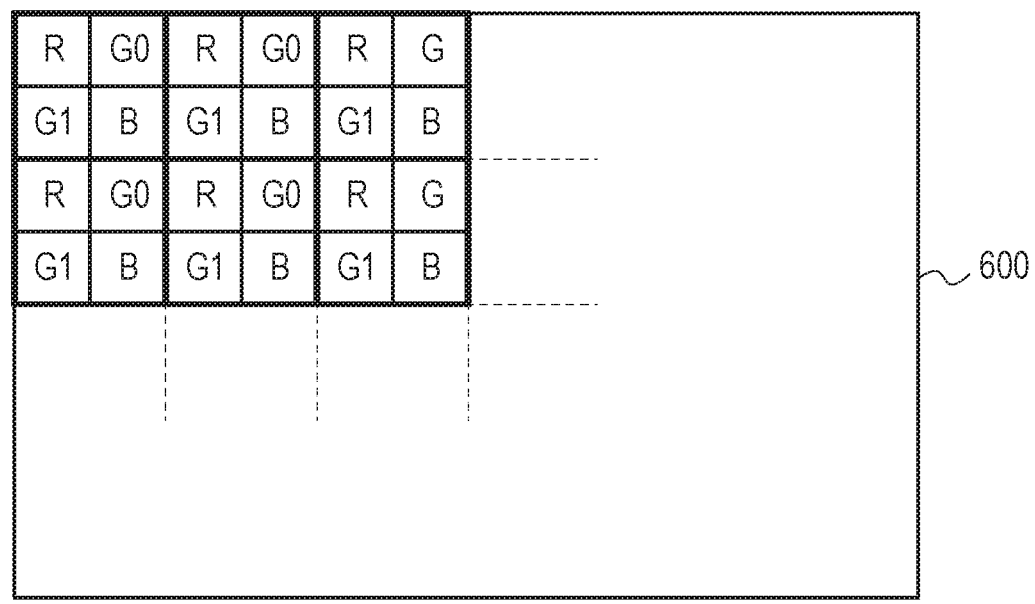
FIGS. 6A and 6B are explanatory diagrams of a data generation method of a 4-plane system.

Regarding the data of the color components of RGB after being subject to the white balance adjustment, the mosaicing circuit 202 regenerates the data of the Bayer array by sampling each data of the R component, the G component, and the B component in accordance with the rule of the Bayer array. That is, the mosaicing circuit 202 regenerates data 600 in which an matrix of the color components of R, G0, B, and G1 is periodically repeated as illustrated in FIG. 6A from the data in which each pixel has three color components of RGB by the synchronization process of the demosaicing circuit 200. The data 600 in which a mosaicing process is conducted by the mosaicing circuit 202 is transmitted to the 4-plane generator circuit 203 as RAW data 600 for regenerated one picture.

Figure 6B:
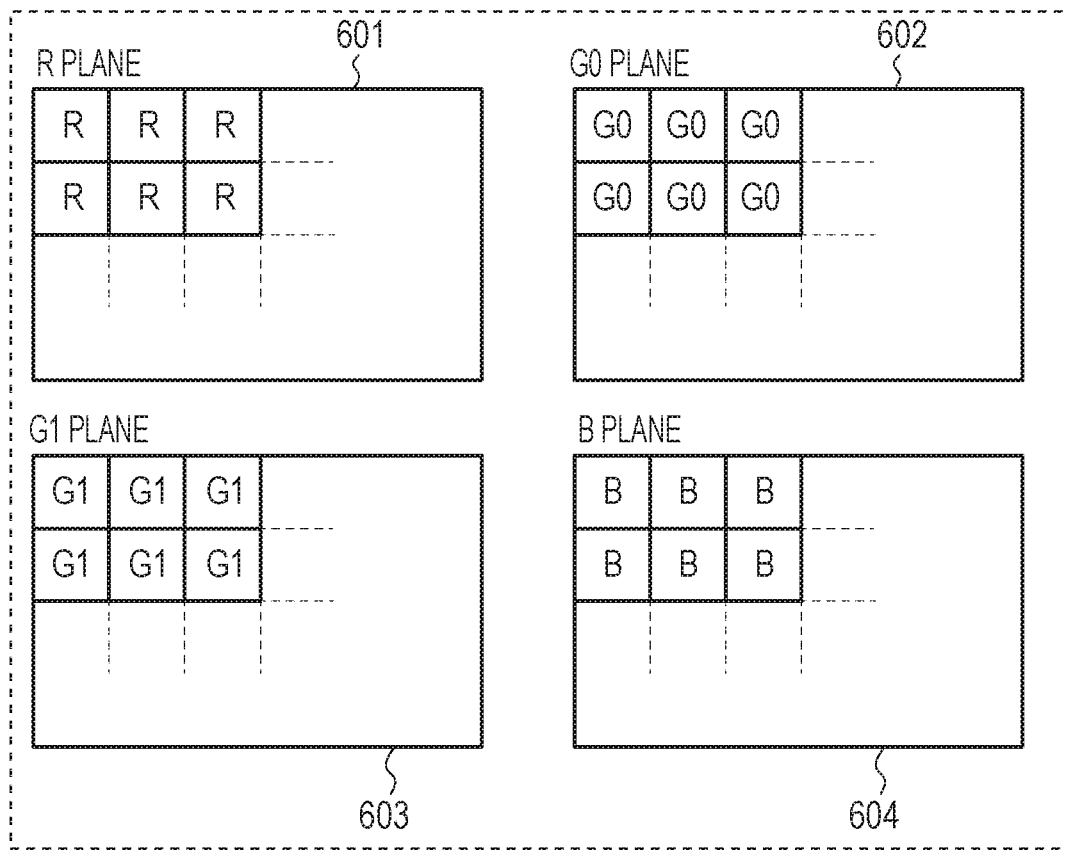

The 4-plane generator circuit 203 separates the RAW data 600 for regenerated one picture as illustrated in FIG. 6A into a plane 601 of the R component, a plane 602 of the G0 component, a plane 603 of the G1 component, and a plane 604 of the B component as illustrated in FIG. 6B. Since a color separation technology to generate the planes of R, G0, B, and G1 from the RAW data 600 is disclosed in Japanese Patent Laid-Open No. 2003-125209 and Japanese Patent Laid-Open No. 2006-121669 described above, etc. and is publicly known, detailed description thereof is omitted. The data of the four planes (601 to 604) separated by the 4-plane generator circuit 203 is transmitted to the frequency conversion circuit 204 of the RAW encoding circuit 211.

Figure 7:
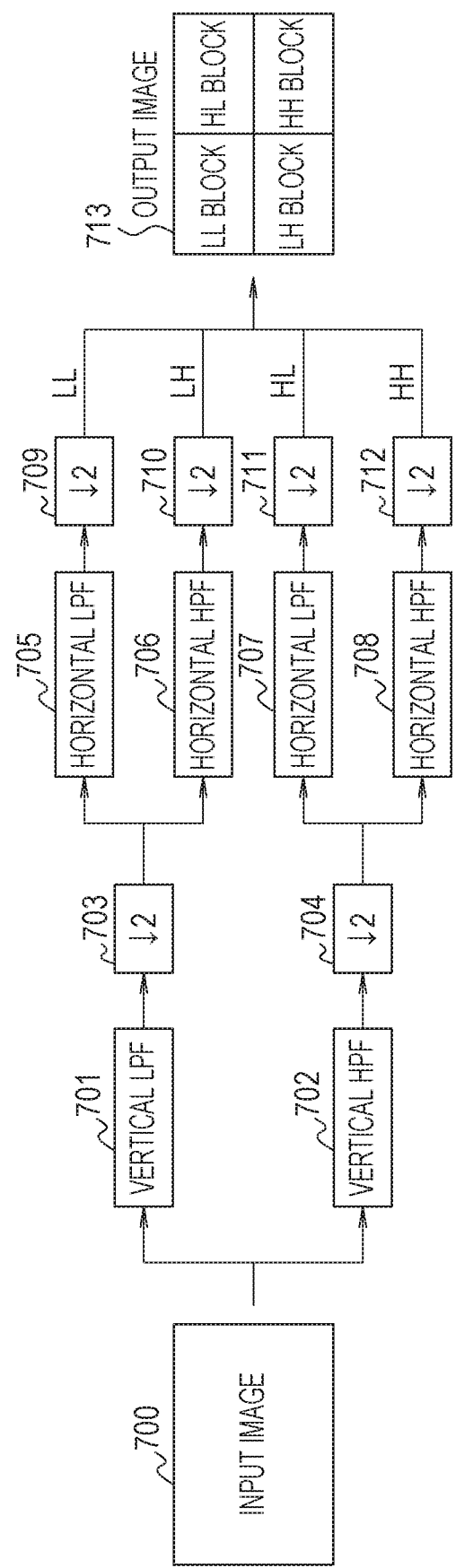
FIG. 7 illustrates an example of a schematic structure for conducting a wavelet transform.

The frequency conversion circuit 204 conducts a wavelet transform process to the data of each of four planes transmitted from the 4-plane generator circuit 203. The frequency conversion circuit 204 transmits a conversion coefficient generated for each subband by the wavelet transform process (hereinafter, a "wavelet coefficient") to the quantization circuit 206. FIG. 7 illustrates an example of a configuration to conduct the wavelet transform process in the frequency conversion circuit 204 (hereinafter, a "wavelet transform unit").

The wavelet transform process by the wavelet transform unit of FIG. 7 is a process employed also in JPEG 2000, and is an example in a case where decomposition to a subband is conducted only one level (1 time). Input image data 700 of FIG. 7 is of one plane in data of four plane, and the wavelet transform unit conducts the wavelet transform process to the data of each four plane. The input image data 700 is transmitted to a vertical low pass filter (LPF) 701 and a vertical high pass filter (HPF) 702. The vertical LPF 701 passes an entire horizontal component included in the input image data 700, and passes only a low-frequency component of a vertical component (hereinafter, a "vertical low-frequency component") included in the input image data 700. The vertical HPF 702 passes an entire horizontal component included in the input image data 700, and passes only a high-frequency component of a vertical component (hereinafter, a "vertical high-frequency component") included in the input image data 700.

The data of the vertical low-frequency component output from the vertical LPF 701 is transmitted to a downsampling circuit 703. The downsampling circuit 703 passes the entire horizontal component of the input image data 700, and conducts 2:1 downsampling of the data of the vertical low-frequency component. Then, data of which resolution in an area of the vertical low-frequency component of the input image data 700 (hereinafter, a "vertical low-frequency region") becomes half is output from the downsampling circuit 703. The data of the vertical high-frequency component output from the vertical HPF 702 is transmitted to a downsampling circuit 704. The downsampling circuit 704 passes the entire horizontal component of the input image data 700, and conducts 2:1 downsampling of the data of the vertical high-frequency component. Then, data of which resolution in an area of the vertical high-frequency component of the input image data 700 (hereinafter, a "vertical high-frequency region") becomes half is output from the downsampling circuit 704.

The data output from the downsampling circuit 703 is transmitted to a horizontal LPF 705 and a horizontal HPF 706. The horizontal LPF 705 passes the entire vertical component included in the input data, and passes only a low-frequency component of a horizontal component (hereinafter, a "horizontal low-frequency component") included in the input data. The horizontal HPF 706 passes the entire vertical component included in the input data, and passes only a high-frequency component of a horizontal component (hereinafter, a "horizontal high-frequency component") included in the input data.

The data output from the horizontal LPF 705 is transmitted to a downsampling circuit 709. The downsampling circuit 709 passes the entire vertical component included in the input data, and conducts 2:1 downsampling of a horizontal component (a horizontal low-frequency component) included in the input data. Then, data of which resolution in an area of the horizontal low-frequency component (hereinafter, a "horizontal low-frequency region") becomes half is output from the downsampling circuit 709. That is, the data output from the downsampling circuit 709 has half the resolution in the vertical low-frequency region, and half the resolution in the horizontal low-frequency region (hereinafter, "data in an LL block").

The data output from the horizontal HPF 706 is transmitted to a downsampling circuit 710. The downsampling circuit 710 passes the entire vertical component included in the input data, and conducts 2:1 downsampling of a horizontal component (a horizontal high-frequency component) included in the input data. Then, data of which resolution in an area of the horizontal high-frequency component (hereinafter, a "horizontal high-frequency region") becomes half is output from the downsampling circuit 710. That is, the data output from the downsampling circuit 710 has half the resolution in the vertical low-frequency region, and half the resolution in the horizontal high-frequency region (hereinafter, "data in an LH block").

The data output from the downsampling circuit 704 is transmitted to a horizontal LPF 707 and a horizontal HPF 708. The horizontal LPF 707 passes the entire vertical component included in the input data, and passes only a low-frequency component (a horizontal low-frequency component) of a horizontal component included in the input data. The horizontal HPF 708 passes the entire vertical component of the input data, and passes only data of a high-frequency component (a horizontal high-frequency component) of a horizontal component of the input data.

The data output from the horizontal LPF 707 is transmitted to a downsampling circuit 711. The downsampling circuit 711 passes the entire vertical component included in the input data, and conducts 2:1 downsampling of a horizontal component (a horizontal low-frequency component) included in the input data. Then, data of which resolution in an area of the horizontal low-frequency component (hereinafter, a "horizontal low-frequency region") becomes half is output from the downsampling circuit 711. That is, the data output from the downsampling circuit 711 has half the resolution in the vertical high-frequency region, and half the resolution in the horizontal low-frequency region (hereinafter, "data in an HL block").

The data output from the horizontal HPF 708 is transmitted to a downsampling circuit 712. The downsampling circuit 712 passes the entire vertical component included in the input data, and conducts 2:1 downsampling of a horizontal component (a horizontal high-frequency component) included in the input data. Then, data of which resolution in an area of the horizontal high-frequency component (a horizontal high-frequency region) becomes half is output from the downsampling circuit 712. That is, the data output from the downsampling circuit 712 has half the resolution in the vertical high-frequency region, and half the resolution in the horizontal high-frequency region (hereinafter, "data in an HH block").

As described above, the wavelet transform unit of FIG. 7 generates and outputs output image data 713 constituted by the data of the LL block, the LH block, the HL block, and the HH block from the input image data 700. The data of the LL block, the LH block, the HL block, and the HH block is the data of the wavelet coefficient in the subband in the wavelet transform. For example, the HH block is a subband in a high frequency region in both the horizontal and the vertical directions. The data of the LL block becomes image data of which resolution is reduced to the half from that of the input image data 700 in both the horizontal and the vertical directions. The HH block, the HL block, and the LH block are in the high frequency region, and most of them are small values. Therefore, data of these blocks is easily compressed by compression encoding.

Description returns to the RAW encoding circuit 211 of FIG. 2.

The encoding amount control circuit 205 sets a target encoding amount to be assigned to a group of four planes described above, that is, the RAW data for one picture described above, and a target encoding amount to be assigned to each of the four planes in accordance with a compression ratio set by a user, for example. The encoding amount control circuit 205 transmits information about the set target encoding amount to the quantization circuit 206.

Data of the wavelet coefficient (the output image data 713) output from the frequency conversion circuit 204 (the wavelet transform unit of FIG. 7) is input in the quantization circuit 206. The quantization circuit 206 determines a quantization parameter based on the target encoding amount set by the encoding amount control circuit 205, and quantizes the wavelet coefficient transmitted from the frequency conversion circuit 204 using the quantization parameter. Data quantized by the quantization circuit 206 is transmitted to the entropy encoding circuit 207.

The entropy encoding circuit 207 conducts an entropy encoding process to the wavelet coefficient quantized in the quantization circuit 206 for each subband, and outputs as encoded data (encoded stream data). The encoded data is stored in large-capacity recording memory provided in the recorder 120. As the entropy encoding process, Embedded Block Coding with Optimized Truncation (EBCOT) etc. may be used, for example.

In the image processing apparatus according to the first embodiment, as described above, since the RAW data is subject to white balance adjustment before compression encoding, no color distortion occurs that might be caused if RGB data is encoded without being subject to white balance adjustment in advance.

For example, with reference to FIGS. 5A and 5B, as illustrated in FIG. 5B, the pixel values of the G component and the B component are not changed significantly, whereas a high gain coefficient is multiplied to the pixel values of the R component in the adjustment of the color temperature in the white balance adjustment. Here, if encoding is conducted before the white balance adjustment and then the white balance adjustment is conducted, for example, a gain coefficient in the white balance adjustment is multiplied also to the quantization error by quantization upon encoding. In the example of FIG. 5A, even if the same quantization is conducted to each component of R, G, and B, since a high gain coefficient is multiplied to the R component in the subsequent white balance adjustment, a high gain coefficient is multiplied also to the quantization error of the R component. Therefore, the quantization error of the R component is larger than the quantization errors of the G component and the B component after the white balance adjustment, which shows that a difference has occurred in the quantization errors of the color components of R, G, and B. Therefore, if the encoded data (the encoded stream data) is decoded and then displayed on a display device etc., the displayed image may be an image of low image quality with color distortion due to a difference in the quantization error of RGB. In the present embodiment, since compression encoding is conducted to the RAW data after white balance adjustment and, therefore, no different gain coefficients are multiplied to the quantization error of each color component of RGB. Therefore, color distortion does not occur and image quality degradation can be prevented.

In the present embodiment, since white balance adjustment is conducted in the white balance adjustment circuit 201 to the data after being subject to the demosaicing process by the demosaicing circuit 200, highly precise white balance adjustment can be conducted. If highly precise white balance adjustment is conducted, image quality degradation is small even if a compression ratio of compression encoding is increased as compared with a case where the RAW data is encoded without being subject to white balance adjustment in advance. Therefore, a higher encoding efficiency is achieved.

In the present embodiment, the demosaicing process is conducted before white balance adjustment, but white balance adjustment may be conducted without conducting the demosaicing process. However, if white balance adjustment is conducted without conducting the demosaicing process, precision of the white balance decreases slightly. Therefore, white balance adjustment is conducted after conducting the demosaicing process as in the present embodiment.

Although an example which employs the 4-plane system is described in the first embodiment, a color conversion circuit 801 as that provided in an image processing apparatus according to a later-described second embodiment illustrated in FIG. 8 may be used instead of the 4-plane generator circuit 203 of FIG. 1. If the color conversion circuit 801 is used, a decrease in perceived resolution can be prevented by assigning a greater amount of encoded data to a plane of luminance (Y) using visual characteristics of humans as described later, whereby subjective image quality can be increased.

An example in which the digital camera 100 includes all of the components from the image capturing unit 208 to the entropy encoding circuit 207 is described in the first embodiment, but this example is not restrictive. A circuit about RAW encoding may be mounted on the recorder 120 to form an image processing system constituted by the digital camera 100 and the recorder 120. For example, the RAW encoding circuit 211 illustrated in FIG. 2 may be mounted on the recorder 120 which may be attached to or detached from the digital camera 100, or circuits subsequent to the mosaicing circuit 202 may be mounted on the recorder 120. In this manner, a configuration about RAW encoding can be eliminated from the digital camera 100.

Second Embodiment

Hereinafter, an image processing apparatus according to a second embodiment is described. FIG. 8 illustrates a schematic structure of a main part of the image processing apparatus according to the second embodiment. FIG. 9 is a flowchart of a process in the image processing apparatus according to the second embodiment.

The image processing apparatus according to the second embodiment differs from the image processing apparatus according to the first embodiment in that the demosaicing circuit 200 and the mosaicing circuit 202 illustrated in FIG. 2 are excluded, whereas a RAW input circuit 210 is included. The image processing apparatus according to the second embodiment may also include the demosaicing circuit 200 and the mosaicing circuit 202 as the above-described first embodiment illustrated in FIG. 1 does. In that case, precision in white balance adjustment may be increased. Although described in detail later, the image processing apparatus according to the second embodiment can switch whether to conduct white balance adjustment and can select which RAW input system is to be used depending on predetermined setting conditions, such as setting of a compression ratio, setting of a material property priority setting, and an image-quality priority setting.

In the image processing apparatus according to the second embodiment, the RAW input circuit 210 includes a 4-plane generator circuit 203, a color conversion circuit 801, and a RAW input system selection circuit 800. The RAW input system selection circuit 800 determines an input system of RAW data in the RAW encoding circuit 211 by selecting which one of the 4-plane generator circuit 203 and the color conversion circuit 801 is to be used. Details of the selection process of the RAW input system selection in the RAW input system selection circuit 800 are described later. Since operations of configurations of those other than the white balance adjustment circuit 201, the 4-plane generator circuit 203, the color conversion circuit 801, the RAW input system selection circuit 800, and the encoding amount control circuit 205 are the same as those of the first embodiment described above, description thereof is omitted.

Figure 8:
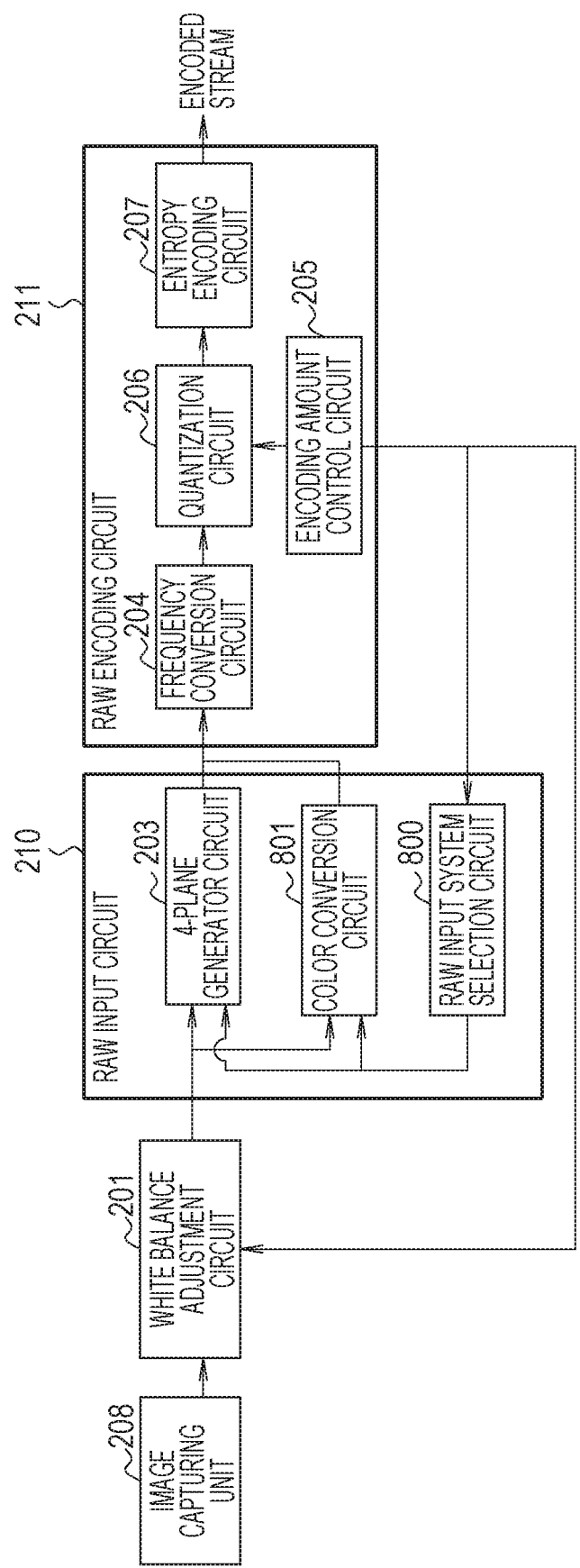
FIG. 8 illustrates an example of a schematic structure of an image processing apparatus according to a second embodiment.
Figure 9:
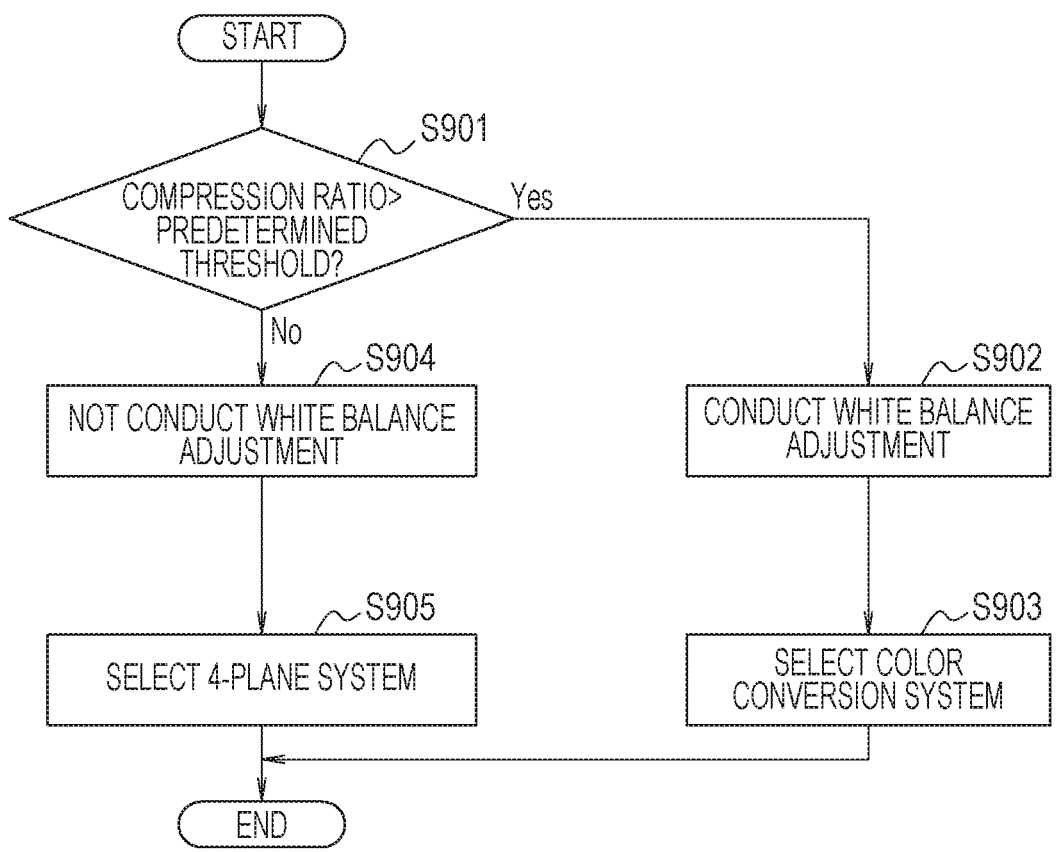
FIG. 9 is a flowchart illustrating an operation of an image processing apparatus.

The process illustrated in the flowchart of FIG. 9 may be implemented by a configuration of FIG. 8 as a hardware configuration, or may be implemented by executing an image processing program related to the present embodiment in a CPU etc. The image processing program may be prepared on an unillustrated ROM etc. in advance, may be read from an unillustrated recording medium, or may be downloaded via the Internet etc. and loaded to RAM etc. The process of the flowchart of FIG. 9 is started when an image is captured. In the following description, steps S901 to S905 of each process of the flowchart are referred to as S901 to S905, respectively.

Hereinafter, an operation of the image processing apparatus according to the second embodiment is described with reference to FIGS. 8 and 9.

First, as a process of S901, the encoding amount control circuit 205 determines whether a compression ratio set by a user is higher (larger) or lower (equal to or lower) than a predetermined threshold and transmits a determination result to the white balance adjustment circuit 201 and the RAW input system selection circuit 800. That is, the encoding amount control circuit 205 in the present embodiment also has functions as an adjustment control unit to control whether to conduct the white balance adjustment, and a generation control circuit to control by which one of the 4-plane system and the color conversion system the plane is to be generated. If it is determined in S901 that the compression ratio set by the user is higher (larger) than the predetermined threshold, the process of the image processing apparatus proceeds to S902. If it is determined in S901 that the compression ratio set by the user is lower (equal to or lower) than the predetermined threshold, the process of the image processing apparatus proceeds to S904.

The process of S904 is conducted by the white balance adjustment circuit 201. In S904, the white balance adjustment circuit 201 conducts a process in accordance with the determination result transmitted from the encoding amount control circuit 205. In this case, since the determination result showing that the compression ratio set by the user is lower (equal to or lower) than the predetermined threshold is transmitted, the white balance adjustment circuit 201 transmits the RAW data input from the image capturing unit 208 to the RAW input circuit 210 without conducting white balance adjustment. After S904, the process of the image processing apparatus proceeds to S905.

The process of S905 is conducted by the RAW input circuit 210. In S905, the RAW input system selection circuit 800 of the RAW input circuit 210 selects a RAW input system in accordance with the determination result transmitted from the encoding amount control circuit 205. In this case, since the determination result showing that the compression ratio set by the user is lower (equal to or lower) than the predetermined threshold is transmitted, the RAW input system selection circuit 800 selects the 4-plane system, and controls to transmit the RAW data input in the RAW input circuit 210 to the 4-plane generator circuit 203.

As described in the first embodiment, the 4-plane generator circuit 203 separates the RAW data into separate planes of R, G0, G1, and B, and outputs data of each plane to the frequency conversion circuit 204 of the RAW encoding circuit 211. Therefore, in the RAW encoding circuit 211, the same process as in the above-described first embodiment is conducted. When the encoding process by the RAW encoding circuit 211 ends, the image processing apparatus completes the process of the flowchart of FIG. 9. If a subsequent image capturing is made, the process of the flowchart of FIG. 9 is conducted for that captured image.

The process of S902 is conducted by the white balance adjustment circuit 201. In S902, the white balance adjustment circuit 201 conducts a process in accordance with the determination result transmitted from the encoding amount control circuit 205. In this case, since the determination result showing that the compression ratio set by the user is higher (larger) than the predetermined threshold is transmitted, the white balance adjustment circuit 201 conducts the white balance adjustment. Specifically, regarding the RAW data input from the image capturing unit 208, the white balance adjustment circuit 201 calculates gain coefficients separately for each color component so that levels of the color components of RGB with respect to an object area considered to be white substantially match. The white balance adjustment circuit 201 matches the levels of the color components of RGB of the RAW data using the gain coefficients of the color components. The RAW data of which levels of the color components of RGB matched in S902 is transmitted to the RAW input circuit 210. After S902, the process of the image processing apparatus proceeds to S903.

The process of S903 is conducted by the RAW input circuit 210. In S903, the RAW input system selection circuit 800 of the RAW input circuit 210 selects a RAW input system in accordance with the determination result transmitted from the encoding amount control circuit 205. In this case, since the determination result showing that the compression ratio set by the user is higher (larger) than the predetermined threshold is transmitted, the RAW input system selection circuit 800 selects the color conversion system, and controls to transmit the RAW data input in the RAW input circuit 210 to the color conversion circuit 801.

The color conversion circuit 801 first separates the input RAW data into separate planes of R, G0, G1, and B as the 4-plane generator circuit 203 does. Then, the color conversion circuit 801 approximately converts the four planes of R, G0, G1, and B into one plane corresponding to luminance and three planes corresponding to color differences using Expressions (9) to (12). Expression (9) is an expression for obtaining one plane corresponding to luminance (Y). Expressions (10) to (12) are expressions for obtaining three planes corresponding to color differences, respectively (Co, Cg, Dg). The color conversion circuit 801 outputs the one plane corresponding to luminance (Y), and the three planes corresponding to color differences (Co, Cg, Dg) to the frequency conversion circuit 204 of the RAW encoding circuit 211 as data of independent planes.

$$Y=(R+G0+G1+B)/4 \tag{9}$$

$$Co=R-B \tag{10}$$

$$Cg = (G0+G1)/2 - (R+B)/2 \quad (11)$$

$$Dg = G0 - G1 \quad (12)$$

Although the process conducted by the RAW encoding circuit 211 is substantially the same as that of the above-described first embodiment, a greater amount of encoded data is assigned to the plane of luminance (Y) if the color conversion system is selected as the RAW input system. When the encoding process by the RAW encoding circuit 211 ends, the image processing apparatus completes the process of the flowchart of FIG. 9. If a subsequent image capturing is made, the process of the flowchart of FIG. 9 is conducted for that captured image.

As described above, in the image processing apparatus according to the second embodiment, if white balance adjustment is conducted, the RAW data is subject to white balance adjustment before being encoded, and then quantized as in the first embodiment described above. Therefore, no color distortion occurs that might be caused if the RGB data is quantized without being subject to white balance adjustment in advance.

The image processing apparatus according to the second embodiment uses the compression ratio set by a user as a predetermined setting condition, and determines whether to conduct the white balance adjustment to the RAW data depending on the setting condition. The image processing apparatus according to the second embodiment uses the compression ratio set by a user as a predetermined setting condition, and selects which one of the RAW input systems (the 4-plane system and the color conversion system) is to be used depending on the setting condition.

For example, if a low compression ratio is set (e.g., a data volume reduced by compression encoding is about ⅓ or smaller of the original data volume), image quality degradation caused by encoding can hardly be recognized visually in many cases. Therefore, if the compression ratio is low, the image processing apparatus according to the second embodiment gives priority to the material property of the image requested when the image after the RAW developing process is edited, and does not conduct white balance adjustment. If the compression ratio is low, the image processing apparatus according to the second embodiment selects the 4-plane system as the RAW input system, and conducts equivalent quantization for each plane. As an exemplary use case thereof, a still image or a high bit rate video image with a material property priority setting is captured, and the captured image is subject to compression encoding, for example.

If a compression ratio set by a user is high, priority to reducing image quality degradation caused by encoding instead of keeping material property is given. Therefore, if a compression ratio is high, the image processing apparatus according to the second embodiment conducts white balance adjustment while giving priority to reduction of image quality degradation. If a compression ratio is high, the image processing apparatus selects a color conversion system as the RAW input system. If the color conversion system is employed, a decrease in perceived resolution can be prevented by assigning a greater amount of encoded data to the plane of luminance (Y) using visual characteristics of humans, and can increase subjective image quality. As an exemplary use case thereof, a low bit rate video image is captured, and the captured image is subject to compression encoding.

The image processing apparatus according to the present embodiment can determine whether to conduct white balance adjustment and can select which one of the RAW input systems (the 4-plane system and the color conversion system) depending not only on the compression ratio but on whether priority is given to the material property or to the image quality. That is, the image processing apparatus determines whether to conduct white balance adjustment and selects which one of the 4-plane system and the color conversion system depending on whether the predetermined setting condition is a setting condition of material property priority or a setting condition of image-quality priority even if the compression ratio is the same. Specifically, material property priority is set as the predetermined setting condition for, for example, a still image or a high bit rate video image, the image processing apparatus does not conduct white balance adjustment. If the material property priority is set, the image processing apparatus uses the 4-plane system as the RAW input system. If the material property priority is set, the image processing apparatus may use the 4-plane system as the RAW input system while not conducting white balance adjustment. If the image-quality priority is set as the predetermined setting condition, the image processing apparatus conducts white balance adjustment. If the image-quality priority is set, image processing apparatus uses the color conversion system as the RAW input system. If the image-quality priority is set, the image processing apparatus conducts white balance adjustment and uses the color conversion system as the RAW input system. The control to switch whether to conduct white balance adjustment depending on the predetermined setting condition is applicable also to the image processing apparatus according to the first embodiment described above. That is, white balance adjustment is conducted to the RAW data before conducting compression encoding in the first embodiment described above, but it is also possible not to conduct white balance adjustment only when a predetermined setting condition is satisfied. The predetermined setting condition of not conducting white balance adjustment in the first embodiment may include a case where the compression ratio described above is set to be low, or a case where a material property priority is set. If it is switched to control not to conduct white balance adjustment in the image processing apparatus according to the first embodiment of FIG. 2, the demosaicing process of the demosaicing circuit 200 and the mosaicing process of the mosaicing circuit 202 may also be controlled not to be conducted.

Among the circuits illustrated in FIG. 8, the RAW encoding circuit 211 or both the RAW input circuit 210 and the RAW encoding circuit 211 may be mounted on the recorder 120 not on the digital camera 100.

In this manner, a configuration about the RAW encoding can be eliminated from the digital camera 100.

Other Embodiments

Although a sensor provided with the CFA in which RGB pixels are arranged in the Bayer array is described as an example of the image capturing sensor in the above-described embodiment, the RGB matrix of the CFA is not limited to the Bayer array. The image capturing sensor may be provided with pixels that can detect white light (W) and infrared ray.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the aspect of the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-098674 filed May 17, 2016 and No. 2017-076793 filed Apr. 7, 2017, which are hereby incorporated by reference herein in their entirety.

What is claimed is:

1. An image processing apparatus comprising:
a demosaicing circuit configured to conduct a demosaicing process to generate data of an image in which each pixel contains each of components of a first color, a second color, and a third color from RAW data of a captured image including the components of the first color, the second color, and the third color arranged in a predetermined matrix;
an adjusting circuit configured to adjust a white balance to data subjected to the demosaicing process;
a mosaicing circuit configured to conduct a mosaicing process to regenerate data of the image of the predetermined matrix from the data of which the white balance was adjusted;
a generator circuit configured to generate data of planes for each component of the first color, the second color, and the third color from data subjected to the mosaicing process; and
an encoding circuit configured to conduct compression encoding, after the white balance was adjusted and the mosaicing process was conducted, of the data of the planes for each component of the first color, the second color, and the third color.

2. The image processing apparatus according to claim 1, wherein
the first color is red, the second color is blue, and the third color is green.

3. The image processing apparatus according to claim 1, wherein:
the generator circuit includes
a first generator circuit configured to generate data of planes for each component of the first color, the second color, and the third color of the image, and
a second generator circuit configured to generate data of a plane corresponding to a component of luminance of the image and data of a plane corresponding to a component of a color difference; and
the encoding circuit conducts the compression encoding of the data of the plane generated by either one of the first generator circuit or the second generator circuit.

4. The image processing apparatus according to claim 3, further comprising
a generation control circuit configured to control which one of generation of data of the plane by the first generator circuit and generation of data of the plane by the second generator circuit is to be conducted by the generator circuit depending on a predetermined setting condition.

5. The image processing apparatus according to claim 4, wherein
the generation control circuit controls the generator circuit to generate data of the plane by the first generator circuit when a compression ratio of compression encoding by the encoding circuit is set to be equal to or lower than a predetermined threshold as the predetermined setting condition and, generate data of the plane by the second generator circuit when the compression ratio is set to be higher than the predetermined threshold as the predetermined setting condition.

6. The image processing apparatus according to claim 4, wherein
the generation control circuit controls the generator circuit to generate data of the plane by the first generator circuit when material property priority of the image is set as the predetermined setting condition, and generate data of the plane by the second generator circuit when image-quality priority of the image is set as the predetermined setting condition.

7. The image processing apparatus according to claim 4, wherein
the generation control circuit controls the generator circuit to generate data of the plane by the first generator circuit when the image is a still image as the predetermined setting condition, and generate data of the plane by the second generator circuit when the image is a video image as the predetermined setting condition.

8. The image processing apparatus according to claim 3, wherein
the data of the plane corresponding to the component of the luminance and the data of the plane corresponding to the component of the color difference are generated by conversion from the data of the planes for each component of the first color, the second color, and the third color.

9. The image processing apparatus according to claim 1, further comprising
an adjustment control circuit configured to control whether to conduct adjustment of the white balance by the adjusting circuit depending on a predetermined setting condition.

10. The image processing apparatus according to claim 9, wherein
the adjustment control circuit controls the adjusting circuit to adjust the white balance when the compression ratio of the compression encoding by the encoding circuit is set to be higher than a predetermined threshold as the predetermined setting condition.

11. The image processing apparatus according to claim 9, wherein the adjustment control circuit controls the adjusting circuit to adjust the white balance when image-quality priority of the image is set as the predetermined setting condition.

12. The image processing apparatus according to claim 9, wherein
the adjustment control circuit controls the adjusting circuit to adjust the white balance when the image is a video image as the predetermined setting condition.

13. An image processing system comprising:
an image pickup apparatus; and
a recorder apparatus attachable to and detachable from the image pickup apparatus, wherein
the image pickup device includes a demosaicing circuit configured to conduct a demosaicing process to generate data of an image in which each pixel contains each of components of a first color, a second color, and a third color from RAW data of a captured image including the components of the first color, the second color, and the third color arranged in a predetermined matrix, an adjusting circuit configured to adjust a white balance to data subjected to the demosaicing process, a mosaicing circuit configured to conduct a mosaicing process to regenerate data of the image of the predetermined matrix from the data of which the white balance was adjusted, and a generator circuit configured to generate data of planes for each component of the first color, the second color, and the third color from data subjected to the mosaicing process, and
the recorder apparatus includes an encoding circuit configured to conduct compression encoding, after the white balance was adjusted, of the data of the planes for each component of the first color, the second color, and the third color, and memory configured to record compression-encoded data.

14. The image processing system according to claim 13, wherein
the generator circuit includes
a first generator circuit configured to generate data of planes for each component of the first color, the second color, and the third color of the image, and
a second generator circuit configured to generate data of a plane corresponding to a component of luminance of the image and data of a plane corresponding to a component of a color difference; and
the encoding circuit conducts the compression encoding of the data of the plane generated by either one of the first generator circuit or the second generator circuit.

15. The image processing system according to claim 14, wherein
the image pickup device includes a generation control circuit configured to control the generator circuit to generate data of the plane by the first generator circuit when a compression ratio of compression encoding by the encoding circuit is set to be equal to or lower than a predetermined threshold, and generate data of the plane by the second generator circuit when the compression ratio is set to be higher than the predetermined threshold.

16. The image processing system according to claim 13, wherein the image pickup device includes an adjustment control circuit configured to control the adjusting circuit to adjust the white balance when the compression ratio of the compression encoding by the encoding circuit is set to be higher than a predetermined threshold.

17. An image processing system comprising:
an image pickup apparatus; and
a recorder apparatus attachable to and detachable from the image pickup apparatus, wherein
the image pickup device includes a demosaicing circuit configured to conduct a demosaicing process to generate data of an image in which each pixel contains each of components of a first color, a second color, and a third color from RAW data of a captured image including the components of the first color, the second color, and the third color arranged in a predetermined matrix, an adjusting circuit configured to adjust a white balance to data subjected to the demosaicing process, and a mosaicing circuit configured to conduct a mosaicing process to regenerate data of the image of the predetermined matrix from the data of which the white balance was adjusted by the adjusting circuit, and
the recorder apparatus includes a generator circuit configured to generate data of planes for each component of the first color, the second color, and the third color from data subjected to the mosaicing process, an encoding circuit configured to conduct compression encoding, after the white balance was adjusted and the mosaicing process was conducted, of the data of the planes for each component of the first color, the second color, and the third color, and memory configured to record compression coded data.

18. The image processing system according to claim 17, wherein
the generator circuit includes
a first generator circuit configured to generate data of planes for each component of the first color, the second color, and the third color of the image, and
a second generator circuit configured to generate data of a plane corresponding to a component of luminance of the image and data of a plane corresponding to a component of a color difference; and
the encoding circuit conducts the compression encoding of the data of the plane generated by either one of the first generator circuit or the second generator circuit.

19. The image processing system according to claim 18, wherein
the recorder apparatus includes generate data of the plane by the first generator circuit when a compression ratio of compression encoding by the encoding circuit is set to be equal to or lower than a predetermined threshold, and generate data of the plane by the second generator circuit when the compression ratio is set to be higher than the predetermined threshold.

20. The image processing system according to claim 17, wherein
the image pickup device includes an adjustment control circuit configured to control the adjusting circuit to adjust the white balance when the compression ratio of the compression encoding by the encoding circuit is set to be higher than a predetermined threshold.

21. An image processing method comprising:
conducting a demosaicing process to generate data of an image in which each pixel contains each of components of a first color, a second color, and a third color from RAW data of a captured image including the components of the first color, the second color, and the third color arranged in a predetermined matrix;
adjusting a white balance to data subjected to the demosaicing process;
conducting a mosaicing process to regenerate data of the image of the predetermined matrix from the data of which the white balance was adjusted;

generating data of planes for each component of the first color, the second color, and the third color from data subjected to the mosaicing process; and compression encoding, after the white balance was adjusted and the mosaicing process was conducted, the data of the planes for each component of the first color, the second color, and the third color.

22. A non-transitory computer-readable storage medium configured to store a program causing a computer to execute an image processing method, the image processing method comprising:

conducting a demosaicing process to generate data of an image in which each pixel contains each of components of a first color, a second color, and a third color from RAW data of a captured image including the components of the first color, the second color, and the third color arranged in a predetermined matrix;

adjusting a white balance to data subjected to the demosaicing process;

generating data of planes for each component of the first color, the second color, and the third color from data subjected to the mosaicing process; and compression encoding, after the white balance was adjusted and the mosaicing process was conducted, the data of the planes for each component of the first color, the second color, and the third color.

* * * * *